Sept. 2, 1958 L. A. GARDNER 2,850,562

TELETYPEWRITER SWITCHBOARD TRUNK CIRCUIT

Filed Oct. 26, 1953 2 Sheets-Sheet 1

INVENTOR
L. A. GARDNER
BY John E. Cassidy
ATTORNEY

Sept. 2, 1958 L. A. GARDNER 2,850,562

TELETYPEWRITER SWITCHBOARD TRUNK CIRCUIT

Filed Oct. 26, 1953 2 Sheets-Sheet 2

INVENTOR
L. A. GARDNER
BY John E. Cassidy
ATTORNEY 2,850,562

TELETYPEWRITER SWITCHBOARD TRUNK CIRCUIT

Leland A. Gardner, Summit, N. J., assignor to Bell Telephone Laboratories, Incorporated, New York, N. Y., a corporation of New York Application October 26, 1953, Serial No. 388,095

4 Claims. (Cl. 178—2)

This invention relates to teletypewriter switching systems and more particularly to a trunk circuit employed in interconnecting two teletypewriter switchboards. Yet, more specifically, the invention is an intertoll trunk terminating circuit having direct-current terminations at each of two teletypewriter switchboards and including facilities for transmitting and receiving communication signals and for transmitting and receiving supervisory signals by frequency-shift carrier means.

An object of the invention is the improvement of teletypewriter switching systems. A more specific object of the invention is the provision of an intertoll trunk terminating circuit having direct-current terminations at each of two switchboards arranged to cooperate in a well-known direct-current teletypewriter switching system and having facilities for transmitting communication and supervisory signals over the line between the direct-current terminations by means of frequency-shift carrier current facilities.

The invention may be understood from reference to the associated drawings which show a preferred embodiment in which the invention is presently incorporated. It is to be understood, however, that the invention is not limited to incorporation in the specific arrangement disclosed but may be practiced in other forms which may be readily suggested to those skilled in the art from a consideration of the following.

Figure 1:
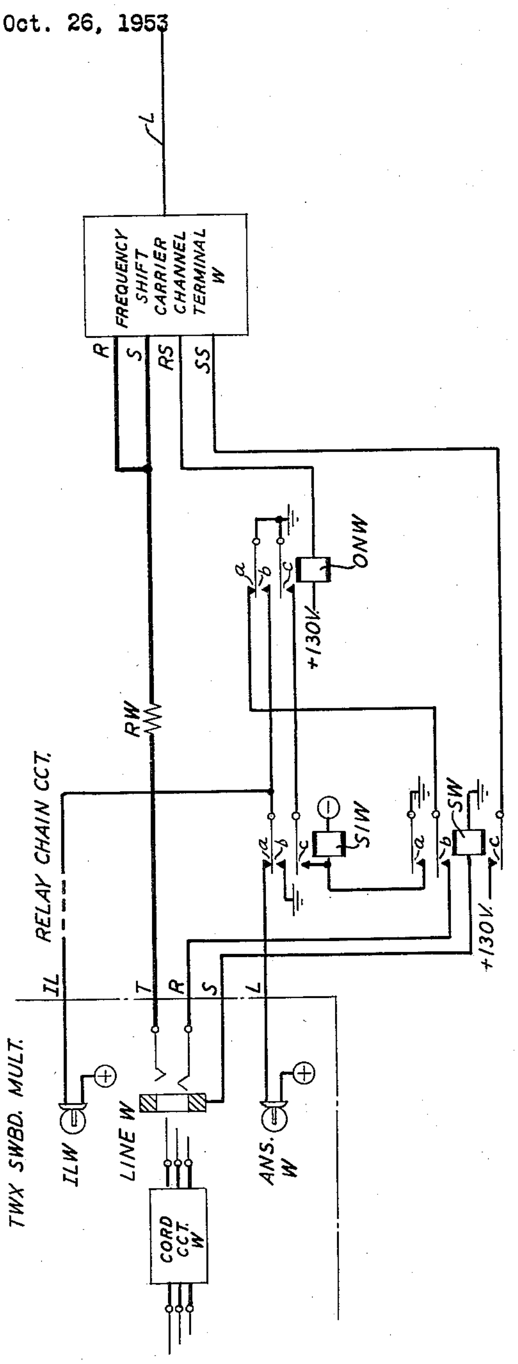
Figure 3:
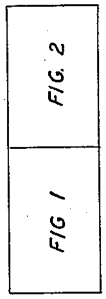
Figure 2:
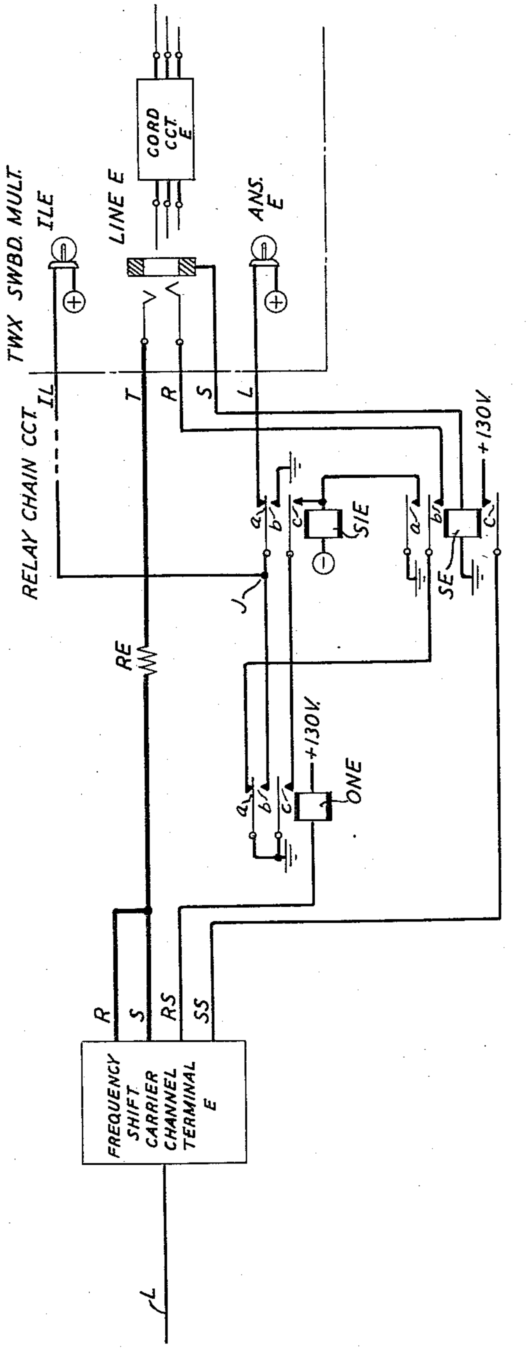

Refer now to the drawings in which Fig. 1 shows a trunk circuit having a direct-current termination at a first switchboard connected through a carrier channel terminal to a line extending to a distant switchboard;

Fig. 2 shows the line incoming through a carrier channel terminal and a trunk circuit having a direct-current termination at a second switchboard; and Fig. 3 shows the manner in which Figs. 1 and 2 should be disposed to form an operative system.

Refer now to Figs. 1 and 2 disposed as in Fig. 3. It will be assumed that the facilities shown in Fig. 1 are the western termination of the trunk and the facilities shown in Fig. 2 are the eastern termination of the trunk. The western termination of the trunk appears in a jack and two lamps associated therewith in a teletypewriter switchboard at the western terminal. The eastern termination of the trunk appears in a jack and two lamps associated therewith in a switchboard at the eastern terminal. It will be observed that electrically the circuits per Fig. 1 and Fig. 2 are identical, Fig. 2 being the inverse of Fig. 1. At the left in Fig. 1 is shown cord circuit W and at the right in Fig. 2 is shown an identical cord circuit, cord circuit E which are employed in making connections to the present trunk. Cord circuit W and cord circuit E are well known in the art. These cord circuits may be any of a number of cord circuits such, for instance, as the teletypewriter cord circuit disclosed in Patent 2,360,040, granted to C. A. Dahlbom, F. S. Kinkead and G. A. Locke, October 10, 1944, which is incorporated herein by reference as though fully set forth herein.

To the right of the jack and lamps in Fig. 1 is shown the direct-current portion of the present trunk, which interconnects the jack and lamps to carrier channel terminal W at the west in Fig. 1. In Fig. 2 the carrier channel terminal E is interconnected to the jack and lamps at the east switchboard by means of the direct-current relay circuit shown intermediate the two. The carrier channel terminal W at the west station and the carrier channel terminal E at the east station are well known in the art. They are disclosed in patent application Serial No. 240,628 of L. A. Gardner and J. L. Hysko, filed August 7, 1951, now Patent 2,667,536, granted January 26, 1954, and in the patent application Serial No. 286,998, of L. A. Gardner and J. L. Hysko, filed May 9, 1952, which are incorporated herein by reference as though fully set forth herein. It is to be understood that the carrier channel terminals disclosed in the patent applications are employed in interconnecting a remote subscriber station to a teletypewriter switchboard, whereas as stated in the foregoing, in the present instance the carrier channel terminals are employed intermediate direct-current trunk circuit terminations in two teletypewriter switchboards.

Conductors R, S, RS and SS in Fig. 1 herein are connected within the frequency-shift carrier terminal W, represented by a captioned rectangle, to the anode of the carrier receiving tubes V53 and V54 in parallel, to the grid of the modulator drive tube 23, to the anode of the supervisory signal control tube 23' and to the +130 v. terminal in the anode circuit of the oscillator tube 20, respectively shown in Figs. 2 and 3 of the drawings in Patent 2,667,536, and the same conductors in Fig. 2 herein connect to corresponding terminals in the frequency-shift carrier terminal E, represented by a captioned rectangle, shown in Fig. 2 herein, both carrier terminals being identical. Conductor R receives direct-current pulses as marking signals and no current as spacing signals from the carrier terminal in response to transmission from the distant terminal, once the carrier terminal is activated. The marking condition prevails except when interrupted for a spacing signal, supervisory signal or break signal. Conductor S is the sending conductor. In response to marking and spacing signals sent from either switchboard through conductor S, the potential conditions on the grid of the modulator drive tube 23 in the carrier terminal are changed and, responsively, the tuning of the oscillator therein is changed. For the marking condition a first frequency $f1$ and for the spacing condition a second frequency $f2$ are transmitted from either carrier terminal to the other. Current flows in conductor RS while the system is activated as the supervisory signal control tube 23' conducts thereafter at all times except when lead SS is opened at the distant switchboard which stops transmission of carrier current. Fundamental in the operation of the system is the control of supervisory signals which are produced by momentarily opening lead SS and thus discontinuing the transmission of carrier in one or the other direction. This responsively stops the flow of direct current in lead RS at the opposite terminal to control relay ONW or ONE in Fig. 1 or Fig. 2, respectively.

In one embodiment of the invention the frequencies transmitted from east to west may be, for instance, 3910 cycles for marking and 3990 for spacing. For the opposite direction, marking current may be 4190 cycles and spacing current 4110 cycles, for instance. For a detailed description of the carrier terminals and frequency choice considerations reference may be had to Patent 2,667,536.

*Trunk idle*

In the idle condition no carrier is transmitted over the line between the two carrier channel terminals. Each carrier channel terminal, as described in the aboveidentified applications, has a portion known as a loop portion, arranged for connection to direct-current facilities. In this case, the loop portion of each carrier will be connected to the direct-current portion of the trunk at each switchboard. The loop side of each carrier terminal is in the marking condition.

*Operator calls*

It will be assumed that an operator, at the west switchboard, connects her cord circuit W to jack Line W. This establishes a circuit from ground through the winding of relay SW and sleeve conductor S, through the sleeve connection of the jack and cord to battery in the cord thereby operating relay SW. The operation of relay SW establishes a circuit from ground through its contact *a* and the winding of relay S1W to battery, operating relay S1W. The operation of relay SW also establishes a circuit from a source of positive potential, which may be positive 130 volts, for instance, through contact *c* of relay SW and conductor SS which extends into the carrier channel terminal W. In response to this, a carrier frequency is transmitted from the west office over the line L to carrier channel terminal E at the east office. The operation of relay SW also establishes a circuit from ground through contact *a* of relay ONW, a contact *b* of relay SW, conductor R and the ring terminal of jack Line W into the ring of cord circuit W. This lights a lamp in the cord circuit W, which remains lighted until the called office answers. The operation of relay S1W establishes a circuit from ground through contact *b* of relay S1W and a relay chain of an idle indicator circuit, well known in the art, conductor IL and the filament of lamp ILW to battery, lighting lamp ILW, which advances the idle indication to the next idle trunk in a well-known manner.

*Operator answers*

The reception of carrier at the called office causes current to flow in lead RS from carrier channel terminal E and the winding of relay ONE to battery, operating relay ONE. The operation of relay ONE establishes a circuit from ground through contact *b* of relay ONE, contact *a* of relay S1E and the lamp ANSE to battery, lighting the lamp, as an indication that a call is incoming. The operation of relay ONE also establishes a parallel circuit from junction J, in the circuit last traced, through the idle indicator relay chain circuit, well known in the art and conductor IL extinguishing the lamp, which serves as an indication at the east terminal that the present trunk has been seized. The operation of relay ONE, by closing its contact *c*, makes available a ground for locking relay S1E, when relay S1E is later operated, in a manner to be described hereinafter.

The called operator connects her cord circuit E to the jack Line E at the eastern switchboard. It is to be understood that cord circuit E at the east station is identical with the cord circuit W at the west station. In response to the connection of the cord, a circuit is established from ground through the winding of relay SE, conductor S and the sleeve of jack Line E into cord circuit E to battery therein, operating relay SE. The operation of relay SE establishes a circuit from ground through contact *a* of relay SE and the winding of relay S1E to battery, operating relay S1E. When relay S1E operates, it locks over a circuit which extends from battery through the winding of relay S1E, contact *c* of relay S1E and contact *c* of operated relay ONE to ground. The operation of relay SE establishes a circuit from positive battery, which may be, for instance, positive 130 volts, through contact *c* of relay SE and conductor SS, into carrier channel terminal E, which effects the transmission of carrier over the line, or carrier transmission circuit, L to the calling office.

In response to the reception of the carrier, from the line L by carrier channel terminal W, conductor RS in carrier channel terminal W is energized and the circuit continues through the winding of relay ONW to positive battery operating relay ONW. When relay ONW operates, a circuit is established from ground through contact *c* of relay ONW, contact *c* of relay S1W and the winding of relay S1W to battery, locking relay S1W. The operation of relay ONW by opening its contact *a* disconnects ground from the path traced through contact *b* of relay SW, conductor R and the ring of jack Line W through the ring circuit of cord circuit W, and the cord circuit lamp is extinguished, indicating that the distant operator has connected a cord circuit.

The trunk circuit is now ready for communication. Relays SW, S1W and ONW in the western circuit are operated and relays SE, S1E and ONE are operated at the east terminal. Relays SW and SE are under control of the respective sleeve circuit of the cord circuit to which each is connected. Relay S1W is locked to relay ONW at the west station and relay S1E is locked to relay ONE at the east station. This will hold the trunk busy at each terminal during a recall to be explained hereinafter.

*Operator recalls*

Either operator may attract the attention of the operator at the distant office by momentarily disconnecting her cord circuit from the line jack, to which it is connected, thereby releasing the local sleeve relay, SW at the west or SE at the east, momentarily. The cord circuit may be equipped with a non-locking recall key, the operation of which would momentarily release the relay SW or relay SE, in lieu of withdrawing the cord circuit from the associated jacks at the switchboards.

While relay SW is released, at the west station, or relay SE is released, at the east station, the positive 130-volt battery connection to the respective conductor SS, at either station, will be disconnected and the carrier, which is impressed on the line L toward the opposite station in response to the connection of positive 130 volts to conductor SS, at a particular station, will be removed. When, for instance, relay SW is released, positive 130-volt battery is disconnected from conductor SS and the carrier current, which ordinarily flows from carrier channel terminal W to carrier channel terminal E, over line L, will be disconnected. Similarly, when relay SE is released, positive 130-volt battery is disconnected from conductor SS, at the easte terminal, and the carrier current which is ordinarily transmitted from carrier channel terminal E over line L from the east terminal to the west terminal, will be removed. When the carrier, ordinarily transmitted from carrier channel terminal W to carrier channel terminal E, is removed, relay ONE, at the east end of the trunk, will be released. Relay S1W, at the western terminal, will remain operated, since it is locked to relay ONW notwithstanding the release of relay SW and carrier is still being transmitted from carrier channel terminal E to carrier channel terminal W to maintain relay ONW operated. With relay S1W held operated, the trunk remains busy during the period that the recall is being sent from west to east and, therefore, the trunk is held busy through the idle indicator chain circuit at the west terminal. The release of relay ONE at the east terminal while the carrier is removed from the line toward the east and the reoperation of relay ONE, when carrier is again transmitted from the west terminal to the east terminal, causes momentary release of relay ONE and the connection of ground through contact *a* of relay ONE, during the period when relay ONE is released, and through contact *b* of relay SE, which remains operative, through conductor R and the ring of the jack Line E into cord circuit E. This results in the flashing of the recall lamp in cord circuit E. When relay ONE again operates in response to the reception of carrier at carrier channel terminal E, ground is disconnected from contact *a* of relay ONE. In response to the flashing of the lamp in cord circuit E, as an operator recall signal, the operator at terminal E may operate a key in the cord to extinguish the flashing lamp and connect her teletypewriter equipment to the cord for communication over the trunk with the operator at the western end of the trunk.

*Operator disconnects*

Either operator may send a disconnect signal by merely disconnecting her cord circuit from the jack Line W or jack Line E. When, for instance, cord circuit W is disconnected from jack Line W, relay SW will release. The opening of contact *c* of relay SW stops the transmission of carrier from carrier channel terminal W to carrier channel terminal E. This in turn releases relay ONE and this time relay ONE remains released, since cord circuit W, at the western terminal, is permanently removed from the jack Line W. With relay ONE released, steady ground is applied through contact *a* of relay ONE and contact *b* of relay SE through conductor R and the ring of jack Line E into cord circuit E. In response to this, the lamp in cord circuit E lights steadily. At the east switchboard, relay SE and relay S1E will remain operated as long as cord circuit E remains connected to jack Line E, notwithstanding the release of relay ONE. Therefore, the trunk is held busy at the eastern terminal after the disconnect signal has been received.

At the office sending the disconnect signal, which we have assumed to be the west office, relay S1W remains locked to relay ONW to hold the trunk busy after the cord has been pulled down at the west terminal. Under this condition, with relay S1W operated, the lamp ANSW at the western board, does not relight, since relay ONW remains operated due to the reception of carrier from the eastern office where it is assumed cord circuit E has not yet been removed from jack Line E.

When the operator, at the eastern switchboard in response to the lighted disconnect lamp in cord circuit E, pulls down cord circuit E, relays SE and S1E will release. This removes the trunk busy condition. The answering lamp ANSE, at the east office, will not relight because relay ONE, at the east office, has already released.

Both ends of the trunk return to normal after the cords at both offices have been disconnected and all relays are released and no carrier will be transmitted over the trunk in either direction.

*Communication break*

A break signal in either direction over the trunk is effected by the transmission of a carrier current frequency assigned for the transmission of a spacing signal. In response to this, relays ONW and S1W or relays ONE and S1E remain operated and, hence, there is no effect on the supervisory circuits.

*Miscellaneous features*

A call can be abandoned by an operator at either station prior to the response of the operator at the opposite station to the answering lamp ANSE or ANSW which first summons the operator's attention to the trunk. This is the case, since each answering lamp, such as lamp ANSE, is under control of the relay, such as relay ONE, which is in turn controlled by carrier transmitted from the distant office. The lamp, such as ANSE, is lighted at the eastern switchboard when relay ONE is operated in response to carrier transmitted from the western switchboard and if the transmission of carrier is terminated by the withdrawal of cord circuit W, for instance, prior to the response by the operator at the eastern switchboard, relay ONE will release and lamp ANSE will be extinguished. The operation for the opposite direction is, of course, identical.

There is a delay of about 300 milliseconds in the application of voltage to the RS lead for operating a relay such as relay ONE. This delay in response is effective to reduce operation of the relay such as ONE, due to momentary interference conditions, such as hits on the line L interconnecting the two stations.

Supervisory signals may be transmitted against steady incoming space signals resulting from a trouble condition. For example, if a steady spacing signal is being sent from the western terminal to the eastern terminal, the eastern terminal can, nevertheless, control relay ONW by the carrier which is being transmitted from carrier channel terminal E to carrier channel terminal W and, hence, the operator at the west station may be signaled by the operator at the east station notwithstanding that a spacing signal is being simultaneously transmitted from the western to the eastern terminal.

What is claimed is:

1. A teletypewriter switching system having a first and a second teletypewriter switchboard, a first and a second direct-current teletypewriter trunk circuit, a first and a second frequency-shift carrier circuit, a carrier telegraph transmission circuit, an operable teletypewriter switching circuit extending in a tandem connection from said first switchboard through said first trunk circuit, said first frequency-shift carrier circuit, said transmission circuit, said second frequency-shift carrier circuit, and said second trunk circuit to said second switchboard in named order, first means in said switching circuit for transmitting telegraph communication signals through said tandem connection in both directions between said switchboards, second means in said switching circuit for transmitting a line calling signal through said tandem connection in both directions between said switchboards, third means in said switching circuit for transmitting operator recall signals through said tandem connection in both directions between said switchboards and fourth means in said switching circuit for transmitting line disconnect signal through said tandem connection in both directions between said switchboards.

2. A telegraph switching system in accordance with claim 1, said system having an individual communication signal path and an individual supervisory signal path interconnecting each of said trunk circuits to its respective directly connected frequency-shift carrier circuit, an individual calling signal control and an individual operator recall control connected to each of said supervisory signal paths.

3. A telegraph switching system in accordance with claim 2 having means for initiating the transmission of carrier current in each direction through said facility between said frequency-shift circuits, means responsive to said initiation for energizing said supervisory paths and means responsive to said energization for actuating said calling signal controls.

4. A telegraph switching system in accordance with claim 2 having means for momentarily interrupting and reestablishing the transmission of carrier current in each direction through said facility between said frequency-shift circuits, means responsive to said interruption and reestablishment for momentarily interrupting and reestablishing the energization of said supervisory signal paths and means responsive to said interruption and reestablishment of said energization for actuating said operator recall controls.

References Cited in the file of this patent

UNITED STATES PATENTS

| | | |
|---|---|---|
| 2,024,581 | Kinkead et al. | Dec. 17, 1935 |
| 2,190,540 | Desmond | Feb. 13, 1940 |
| 2,206,659 | Bonorden | July 2, 1940 |
| 2,455,617 | Shepard | Dec. 7, 1948 |
| 2,573,392 | Boughtwood et al. | Oct. 30, 1951 |